United States Patent
Hellenbrand (10) Patent No.: US 11,884,489 B2
(45) Date of Patent: Jan. 30, 2024

(54) PICKING DEVICE FOR STORING MEDICINE BOTTLES AND METHOD FOR RETRIEVAL

(71) Applicant: Becton Dickinson Rowa Germany GmbH, Kelberg (DE)

(72) Inventor: Christoph Hellenbrand, Kaifenheim (DE)

(73) Assignee: BECTON DICKINSON ROWA GERMANY GMBH, Kelberg (DE)

( * ) Notice: Subject to any disclaimer, the term of this patent is extended or adjusted under 35 U.S.C. 154(b) by 460 days.

(21) Appl. No.: 17/006,597

(22) Filed: Aug. 28, 2020

(65) Prior Publication Data

US 2020/0391943 A1 Dec. 17, 2020

Related U.S. Application Data

(63) Continuation of application No. 15/944,263, filed on Apr. 3, 2018, now Pat. No. 10,793,354.

(51) Int. Cl.
*B65G 1/06* (2006.01)
*B25J 15/00* (2006.01)
*B65G 1/137* (2006.01)

(52) U.S. Cl.
CPC ............ *B65G 1/06* (2013.01); *B25J 15/0028* (2013.01); *B25J 15/0038* (2013.01);
(Continued)

(58) Field of Classification Search
None
See application file for complete search history.

(56) References Cited

U.S. PATENT DOCUMENTS 4,132,318 A * 1/1979 Wang ................... B25J 9/0015
414/21
4,268,207 A 5/1981 Pipes
(Continued)

FOREIGN PATENT DOCUMENTS

CN 104627679 A 5/2015
CN 105620994 A 6/2016
(Continued)

OTHER PUBLICATIONS

Chinese Office Action for Application No. 201980018268.9, dated Oct. 29, 2021, 20 pages including translation.

*Primary Examiner* — Mark C Hageman
(74) *Attorney, Agent, or Firm* — Morgan, Lewis & Bockius LLP (57) ABSTRACT

A picking device for storing bottles and a corresponding method are provided. The picking device includes a plurality of storage locations for bottles, an operating device having a gripper, at least one storing device, at least one identification device and an unloading device. The storage locations have storage location receptacles and the storing device has at least one storing receptacle for bottles, wherein the storage location receptacles and the storing receptacle are configured such that the bottles are held therein in such a way that they are protected against rolling. The gripper includes a gripping member configured such that the bottles are movable from the storing receptacles and storage location receptacles by being lifted by the gripping member or by being pulled to a holding area of the gripper.

20 Claims, 6 Drawing Sheets

(52) U.S. Cl.
CPC ...... *B65G 1/137* (2013.01); *B65G 2201/0244* (2013.01); *B65G 2203/0208* (2013.01)

(56) References Cited

U.S. PATENT DOCUMENTS

| | | |
|---|---|---|
| 4,406,570 A | 9/1983 | Duncan |
| 4,485,930 A | 12/1984 | Savelkouls |
| 6,719,151 B2 | 4/2004 | Close |
| 9,296,569 B2 * | 3/2016 | Hellenbrand ............ B65G 1/04 |
| 10,242,161 B2 * | 3/2019 | Yamagishi ............. G16H 20/13 |
| 2006/0182609 A1 | 8/2006 | Guerra |
| 2008/0152466 A1 | 6/2008 | Bonora |
| 2008/0302815 A1 | 12/2008 | Guerra |
| 2010/0108625 A1 | 5/2010 | Meers |
| 2011/0054668 A1 | 3/2011 | Holmes |
| 2014/0154044 A1 | 6/2014 | Van Ooyen et al. |
| 2014/0316556 A1 * | 10/2014 | Hellenbrand .......... B65G 1/137 700/216 |
| 2016/0213172 A1 * | 7/2016 | Christoffersen ........ A47F 13/08 |

FOREIGN PATENT DOCUMENTS

| | | |
|---|---|---|
| CN | 106429136 A | 2/2017 |
| DE | 3411117 A1 | 10/1985 |
| DE | 102009042572 | 3/2011 |
| EP | 1847489 A1 | 10/2007 |
| EP | 2581328 | 4/2013 |
| JP | H1189691 A | 4/1999 |

\* cited by examiner

PICKING DEVICE FOR STORING MEDICINE BOTTLES AND METHOD FOR RETRIEVAL

CROSS-REFERENCE TO RELATED APPLICATION

This is a continuation of U.S. patent application Ser. No. 15/944,263, filed on Apr. 3, 2018, which issued as U.S. Pat. No. 10,793,354 on Oct. 6, 2020, entitled "PICKING DEVICE FOR STORING MEDICINE BOTTLES AND METHOD FOR RETRIEVAL," the disclosure of which is hereby incorporated by reference in its entirety for all purposes.

BACKGROUND

The present disclosure relates to a picking device for storing bottles and a method for retrieving bottles from this picking device. In particular, the present disclosure relates to a picking device for storing medicine bottles and a method for retrieving such medicine bottles.

SUMMARY

One or more embodiments provide a picking device for storing bottles. The picking device includes a control device and an operating device coupled to the control device, the operating device displaceable horizontally in an X direction and vertically in a Z direction. The operating device includes a gripper having a vertical axis and configured to be turned 180 degrees about its vertical axis, and a gripping member configured to move a bottle from a storage location by one of being lifted by the gripping member and being pulled to a holding area of the gripper.

One or more embodiments provide an operating device for use with a picking device for storing bottles. The operating device includes a gripper having a vertical axis and configured to be turned 180 degrees about its vertical axis, and a gripping member configured to move a bottle from a storage location by one of being lifted by the gripping member and being pulled to a holding area of the gripper, wherein the operating device is displaceable horizontally in an X direction and vertically in a Z direction and wherein the gripping member is displaceable in a Y direction orthogonal to each of the X and Z directions.

One or more embodiments provide a picking device for storing bottles. The picking device includes a plurality of storage locations for bottles; an operating device displaceable in front of the storage locations horizontally in an X direction and vertically in a Z direction, the operating device coupled with a control device and having a gripper; at least one storing device configured to be used to move bottles into the picking device and from which the operating device is configured to remove the bottles; at least one identification device for identifying bottles; and an unloading device to which the bottles are transferred by the operating device for retrieval from the picking device, wherein a plurality of the storage locations have storage location receptacles and the storing device has at least one storing receptacle for bottles, wherein the storage location receptacles and the storing receptacles are configured such that the bottles are held therein in such a way that they are protected against rolling, and wherein the gripper has a gripping member configured such that the bottles are movable from the storing receptacles and the storage location receptacles by one of being lifted by the gripping member and being pulled to a holding area of the gripper.

One or more disclosed embodiments provide a method for retrieving bottles from a picking device. The method includes determining, by a control device, a storage location of a bottle that is to be retrieved; displacing, within the picking device, an operating device coupled with the control device to the determined storage location; removing the determined bottle from a storage location receptacle associated with the storage location using a gripper of the operating device. The removing the determined bottle includes moving the prongs of a gripping member of the gripper parallel to a storage location receptacle of the bottle in a Y direction, at least in sections, in a space defined by the cross-section of the bottle and situated below a maximum cross-section in an X direction; moving the prongs upwards in a Z direction and producing at least one of a frictional connection and a positive connection between the prongs and the bottle; moving the bottle away from the storage location receptacle; and transferring the to an unloading device of the picking device using the operating device.

The foregoing and other features, aspects and advantages of the disclosed embodiments will become more apparent from the following detailed description and accompanying drawings.

BRIEF DESCRIPTION OF THE DRAWINGS

The device according to the present disclosure and the method according to the present disclosure are described in greater detail below, with reference to the appended drawings.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

In the picking devices known in the art, a large number of different and differently dimensioned pharmaceutical packages are stored on extended shelves in a disorganized manner and for space optimization. The stored pharmaceutical packages are retrieved by means of an operating device for which purpose the pharmaceutical packages disposed on a shelf are moved to a holding zone of a gripper using a gripping means of the gripper of the operating device. In known picking devices, the gripping means of the gripper are typically configured as a pair of clamping jaws which are used to pull the pharmaceutical packages to the holding zone.

Based on the dimensions of the pharmaceutical packages that are to be stored and the occupancy of the picking device, an optimum storage location is calculated for a pharmaceutical package that is to be stored, saved in a control device and the pharmaceutical package is subsequently moved to a holding location on a shelf corresponding to the storage location. Calculating an optimum storage location requires the control device of the picking device to know the exact geometric structure of the picking device and in particular the location or configuration and dimensions of the shelves as this is the only way to prevent a position from being chosen as storage location within the picking device which is "occupied," for example, by a shelf wall bearing the shelves.

In the picking device described above, pharmaceutical packages are thus not arranged at storage locations that were pre-determined prior to the storing, such as it used to be the case in traditional drawer systems in pharmacies. Instead, a pharmaceutical package is stored, irrespective of the type of medicine, at a storage location whose dimensions are optimally suited to the dimensions of the pharmaceutical package that is to be stored. As the different pharmaceutical packaging have different dimensions and storing and retrieval operations take place continuously, the configuration of storage locations on a shelf changes as well, (e.g., the storage locations as such are not associated with a specific section of a shelf but vary dynamically in the course of storing and retrieval operations). Naturally, a storage location is always associated with a physical place of storage which, however, changes as the storage location changes.

Although the pharmaceutical packages differ in their dimensions, they all have a flat base and parallel side panels orthogonally disposed to the base which can be gripped by the clamping jaws for retrieval. In known picking devices, it is, due to the design of the gripper and the shelves, only possible to store bottles of any type if such bottles are arranged in special supports, which resemble customary pharmaceutical packages with respect to their dimensions and can therefore be moved accordingly. Storing bottles without such supports is only possible with limitations (e.g., narrow and tall bottles cannot be stored without supports using the known picking devices).

Thus, it is desired to provide a picking device in which bottles of any type may be stored without a support or outer packaging. Furthermore, it is desired to provide a method for retrieving the bottles from storage.

The subject picking device may include multiple storage locations for bottles, an operating device displaceable in front of the storage locations horizontally in an X direction (e.g., the longitudinal direction of the picking device) and vertically in a Z direction, coupled with a control device and having a gripper. The picking device may also include at least one storing device used to move bottles into the picking device and from which the operating device may remove bottles, at least one identification device for identifying bottles and one unloading device to which bottles may be transferred by the operating device for retrieval from the picking device.

Multiple storage locations, though not necessarily all of them, may have storage location receptacles. The storing device may have at least one storing receptacle for bottles, wherein a storage location receptacle and the storing receptacles may be configured such that the bottles are held therein in such a way that they are protected against rolling. The gripper may include a gripping member configured such that the bottles are movable from the storing receptacles and storage location receptacles by being lifted by the gripping member or by being pulled to a holding area of the gripper.

In some picking devices, each storage location is associated with a section of a flat shelf on which the pharmaceutical package is placed. The distribution of the storage location varies over time since pharmaceutical packages of different sizes are stored and retrieved. Thus, it is not feasible to store bottles in a lying position on such flat shelves without the bottles rolling away.

By contrast, the subject picking device provides for multiple storage locations having the above-mentioned storage location receptacles in or on which a bottle can be stored in a lying position without rolling away orthogonally to the longitudinal direction of the bottle. The storage location receptacle assumes the role of the shelf section in known picking devices (e.g., effects the actual physical stationary storage).

Since the bottles are stored in a lying position for space-optimized storage, the subject picking device provides for the bottles to be moved into the picking device in a lying position as well. Though the bottles may also be moved into the picking device in an upright position on a customary storing conveyor belt, this would, however, require the bottles to be turned prior to storage. Furthermore, there is an increased risk that the bottles will tip over when they are moved into the picking device. Since bottles cannot be moved in a lying position without such bottles rolling away if a customary storing device configured as conveyor belt is used, the subject device provides for the storing device to have a plurality of storing receptacles that prevent the bottles from rolling away.

In order to enable moving the bottles from the storing device to a storage location, the gripper may have a correspondingly adapted gripping member. Many designs are conceivable in this respect. For example, the gripping member may move down from above, grip the bottles and lift them from the storing device to a storage location.

The above-mentioned storage locations may not be stationary either, but instead may depend on the dimensions of the bottles that are to be stored. If, for example, a section of the picking device providing the storage locations is 30 cm deep, three bottles of 8 cm in height or depth or two bottles of 14 cm in height or depth could theoretically be stored there in a lying position, one after another. If three bottles are to be stored one after another in a lying position, three storage locations may be provided in this row (e.g., 8 cm bottles), in the other case only two (e.g., 14 cm bottles). The same applies to the storage location receptacles. Taking the above-mentioned example, an overall storage location receptacle may provide two or three storage location receptacles (e.g., one storage location receptacle for each storage location).

By providing location receptacles and storage location receptacles on the storing device and the storage locations that prevent the bottles lying thereon from rolling away, it is feasible to substantially handle them in the same way as angular pharmaceutical packages because the location receptacles and storage location receptacles ensure that a control device knows the exact positioning of a bottle at all times. In this way, bottles may be stored in the picking device and retrieved therefrom quickly and in a space-saving manner. Costly turning devices for the bottles are not needed and there is no risk that the bottles might tip over as is present with storage in an upright position at all times. Furthermore, it is feasible to store both bottles and customary pharmaceutical packages in one picking device by providing only sections of the storing device with storing receptacles for bottles and having only a portion of the storage locations equipped with storage location receptacles.

Where the term "bottle" is used within this application, the plural thereof shall be included. If, for example, it is remarked that a bottle is moved from the storing device to a storage location using the gripping means, this is intended to include that multiple uniform bottles are routinely moved from the storing device to several storage locations or storage location receptacles associated with the storage locations using the gripping member. Bottle is intended to mean all containers that are at least in sections circularly cylindrical (e.g., a customary bottle, cans, etc.).

The design of the storing receptacles ensures that bottles lying thereon are prevented from rolling away in a longitudinal direction. For example, the bottles may be temporarily clamped on or in the storing receptacles and storage location receptacles.

In one or more embodiments, the storing receptacles and storage location receptacles may have a recess extending in a Y direction orthogonally to the X direction. The bottles lie in these recesses in a longitudinal direction and the combination of a recess and the related side walls protects the bottles from rolling away in the X direction. Advantageously, the receptacles may be configured such that bottles of different diameters may be arranged without a need to structurally change the recesses. The design of the recess itself must be adapted to the bottles that are to be stored in the picking device. If the bottles' diameters vary greatly, it may be necessary to provide for receptacles of different depths/widths.

One or more embodiments provide for the storing receptacles to be configured as storing recesses in a storing member of the storing device and/or as raised storing bases, wherein both the storing recesses and the storing bases are configured such that they protect the bottles from rolling when they are in a lying position. Both of the above-mentioned alternatives may be implemented in a structurally simple manner and provide the option of adjusting the storing device to daily storing and retrieval needs. The storing recesses in the storing member may be configured as simple grooves, whose width and depth depends on the dimensions of the bottles that are to be stored, do not routinely interfere with the storing of pharmaceutical packages because they can be arranged above the storing recesses in such a way that a safe transport of the pharmaceutical packages is still ensured. The storing bases may be configured such that they can be removed from the storing member. For example, the storing bases may be temporarily attached via magnets recessed in the storing member. As another example, a dovetail connection may be used to slide the storing bases in the storing member and remove them therefrom if additional space is needed for storing pharmaceutical packages.

The storage location receptacles may also be configured as storage recesses with a storage location and/or as raised storage location bases, wherein the storage location recesses and the storage location bases may be configured such that they protect the bottles from rolling when they are in a lying position. Here, the shelves typically available in a picking device may be advantageously used. The storage location recesses may be incorporated in the shelf as a simple groove and the storage location bases may simply be attached (e.g., temporarily) on a customary shelf.

The storing receptacles and/or storage location receptacles may be formed by a plurality of parallel storing struts or storage location struts. The storing member of the storing device may have multiple parallel storing struts that are guided at their ends. Here, the storing device may have a section for pharmaceutical packages and a section for bottles, for example. The storage location struts may be configured as simple brackets on a wall of the picking device. A pair of storage location struts or storing struts, respectively, may then form the storing receptacle or storage location receptacle. One advantage of the use of storage location struts, in particular, is that a defined storage area may be provided with less material and thus less weight in comparison to a shelf of the same dimensions.

As with customary pharmaceutical packages, the bottles that are to be stored have different dimensions (e.g., different lengths and/or different diameters). If the storing receptacles and storage location receptacles have a central recess orthogonal to the X direction that allows storing bottles of different dimensions, all storing receptacles and storage location receptacles may have the same outer receptacle width AB. This has the advantage that the gripping member does not need to be adapted to the dimensions of the storing receptacles and storage location receptacles. The parallel displaceability of gripping members (e.g., clamping jaws) routinely required for placing and retrieving customary pharmaceutical packages is not required in this case. Thus, the gripper may be kept constructionally simple and placing and retrieving operation may be performed even faster. The gripping member of the gripper may simply be moved under the bottle (e.g., into the space below the cross-section of a bottle (e.g., shadow space)) and the gripping member is lifted. As soon as a frictional connection and/or positive connection with the bottle is produced, the bottle may be either pulled or lifted from a receptacle, wherein the type of storing receptacle or storage location receptacle determines whether a bottle is or can be lifted or pulled.

In particular of the gripper, it may thus be provided for the gripping member of the gripper to have two prongs of fork-shaped construction that may be displaceable in a Y direction orthogonally to the X direction, and in a Z direction, and that are configured such that they are movable in the Y direction in a space defined by the cross-section of the bottle that is to be retrieved and situated below the maximum cross-section.

In this context, the prongs of the gripping member may be arranged in a stationary manner on the gripping member, wherein the distance DI between opposite inner surfaces of the prongs is greater than the outer receptacle width AB. As explained above, the construction of the device may be made particularly simple because parallel displacement of the prongs is not required.

With respect to the prongs, the prongs may be a circular cylinder-shaped or rod-shaped configuration, wherein the two prongs may be rotatable about a longitudinal axis when they are in the rod-shaped design. The circular cylinder-shaped prongs have the advantage that they are of simple construction and thus accordingly inexpensive. The rod-shaped prongs can provide a larger contact surface for contacting a bottle that is to be retrieved. This can also enable the pulling of heavy bottles via a frictional connection.

In a picking device in which both bottles and pharmaceutical packages are stored, it is particularly advantageous if the rod-shaped prongs are rotatable about their longitudinal axis. If the two inner surfaces are aligned parallel to one another (e.g., the prongs are vertically aligned), they are particularly suitable for retrieving pharmaceutical packages. If the rod-shaped prongs are disposed in a V-shaped manner with respect to one another (e.g., they are both turned inwards at the "bottom"), the prongs are well-suited for retrieving bottles.

One or more embodiments provide for at least one prong to have a carrier at its end. This carrier may be integral with the prong (e.g., formed as a kind of section of the prong) or it may be attached to one end of the prong. The carrier is suited to produce an additional positive connection between the bottle that is to be retrieved and the prong, enabling even heavy bottles to be pulled from the storage location receptacle.

Prior to storing the bottles, they are identified by an identification device of the picking device such that a precise link may be established between the bottle that is to be stored and the storage location. The dimensions of a bottle may be known to the control device based on the identification data of the bottle. However, it is not uncommon that the manufacturers of medicines change the dimensions of the packaging or bottle while the content stays the same. For example, a medicine X, bottle capacity of 200 ml, can be marketed in a bottle of a height H1 and diameter D1 for a time, and then be changed, for example for aesthetic reasons, to a bottle of height H2 and diameter D2. The use of the measuring device ensures that the control device is informed of the precise dimensions of a bottle that is to be stored at any time such that the ideal storage location within the picking device may always be determined using this information.

The subject technology includes one or more methods for retrieving bottles from a picking device. A storage location of a bottle that is to be retrieved may be determined using a control device, an operating device coupled with the control device may be moved within the picking device to the determined storage location, and the determined bottle may be removed from a storage location receptacle associated with the storage location using a gripper of the operating device.

The prongs of a gripping member of the gripper may be moved parallel to a storage location receptacle of a bottle that is to be retrieved in the Y direction, at least in sections in a space defined by the cross-section of the bottle that is to be retrieved and situated below the maximum cross-section. Subsequently, the prongs may be moved and/or turned upwards in the Z direction and thus a frictional connection and/or positive connection may be produced between the prongs and a bottle that is to be retrieved. Via the frictional connection and/or positive connection, the bottle that is to be retrieved may be moved away from the storage location receptacle. Subsequently, the bottle that is to be retrieved may be transferred to an unloading device of the picking device using the operating device. A positive connection may be produced, for example, by a carrier section on a prong that is suited to engage behind a bottle that is to be retrieved.

The prongs may be moved in a space formed by the cross-section below the maximum cross-section (e.g., the space below the maximum cross-section in the X direction, which may be a space defined by a projection of the outer circumference of the bottle onto a plane situated thereunder). Here, it is sufficient if only one section of the prongs is moved "under" the bottle (e.g., in the above-mentioned space). However, it is essential that the minimum distance of opposite surfaces of the prongs is less than the diameter of the bottle that is to be retrieved. To produce a frictional connection between the prongs and the bottle, the prongs may be moved upwards in the Z direction. As soon as the frictional connection has been produced, the bottle may be moved away from the storage location.

One or more embodiments provide for the bottle that is to be retrieved to be moved from the storage location by pulling the bottle, after producing the frictional connection and/or positive connection between the prongs and the bottle, from the storage location receptacle onto the gripper by moving the prongs of the gripping member backwards in the Y direction (e.g., towards the gripper). It may be sufficient for this purpose to produce only a frictional connection between the bottle(s) that is/are to be retrieved and the inner surfaces of the prongs. Particularly, for heavy and/or several bottles it may be necessary to produce an additional positive connection, for example, between carriers on the prongs and the bottle(s) that is/are to be retrieved. By this positive connection, the bottle may then be pulled from the storage location. To reduce the force required to pull the bottle after the positive connection has been produced, it may be provided for producing a frictional connection and a positive connection. For this purpose, the bottle that is to be retrieved may be slightly lifted via a movement of the gripping member in the Y direction.

One or more embodiments provide for the bottle that is to be retrieved to be moved away from the storage location by, after producing the frictional connection, lifting the bottle from the storage location receptacle via a movement in the Z direction and by subsequently moving the prongs of the gripping member backwards in the Y direction. A corresponding procedure may be particularly preferred if a gap exists between the gripper and the storage location receptacle due to structural restrictions that make it difficult to pull the bottle onto the gripper or even prevent it.

However, to enable heavy bottles to be pulled from the storage location receptacle, as mentioned above, it may be provided for at least one of the prongs to have a carrier at one end for producing a positive connection between the carrier and the bottle that is to be retrieved in addition to or as an alternative to producing a frictional connection. When the positive connection is produced, the carrier may engage behind a section of the bottle such that pulling of the bottle may be enabled by the positive connection even if the frictional connection is not sufficient for pulling the bottle. This can be particularly advantageous for heavy bottles and/or very deep storage areas because it is feasible to use prongs that are less stable. Also, it is structurally simpler to anchor such prongs on the gripper. Engaging behind the bottle may be achieved, for example, by turning a carrier behind a bottle or by moving the carrier behind a wide bottle area from below or above.

Figure 1:
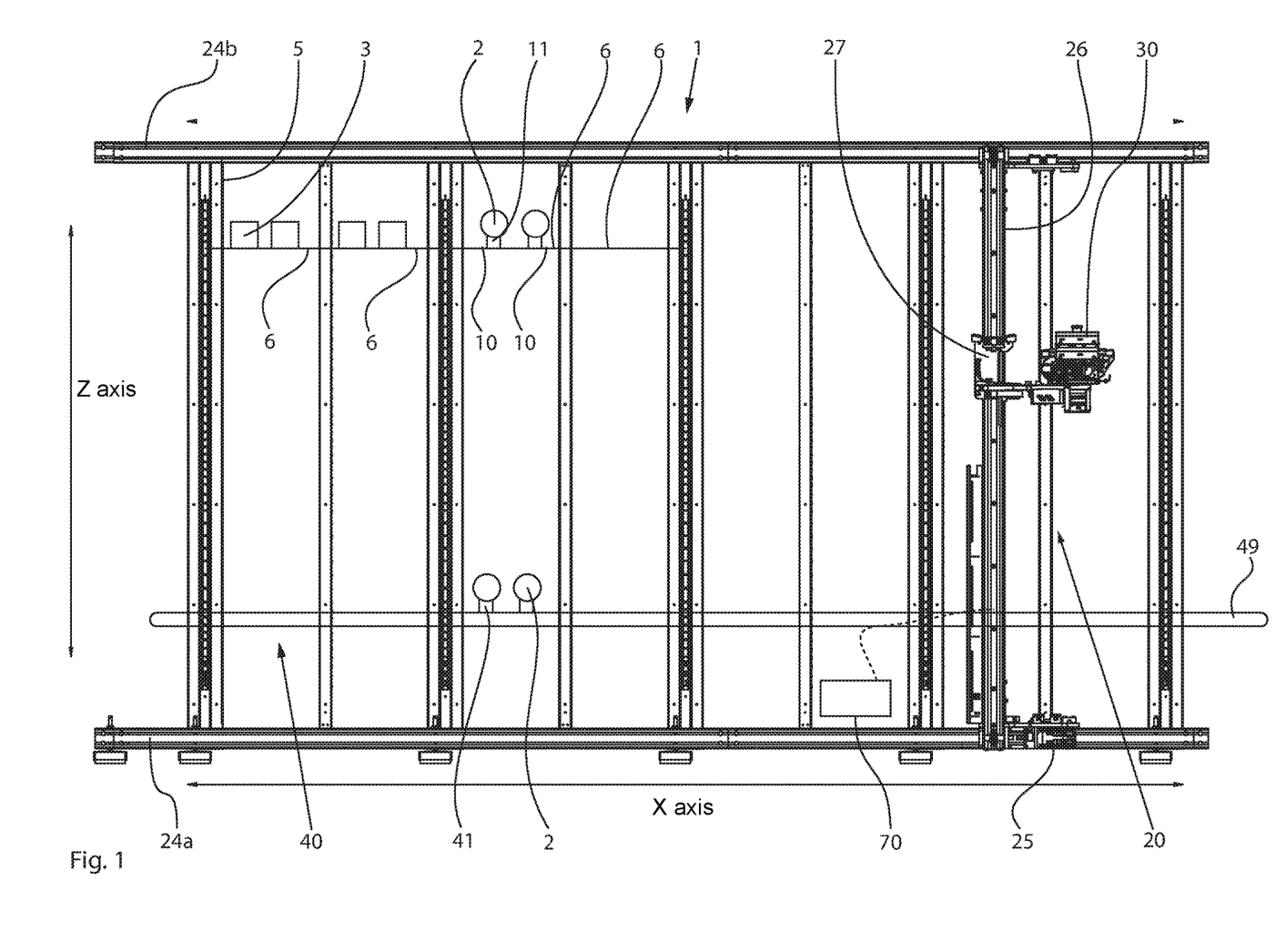
FIG. 1 shows a schematic side view of one or more embodiments of a picking device.

FIG. 1 shows a sectional side view of a picking device 1. The section is made along a central channel in which an operating device 20 is displaceable along a vertical guide 26 and two horizontal guides 24*a*, 24*b*. The operating device 20 may include two drives 25, 27 to displace a gripper 30 horizontally and vertically in the channel. In the illustrated sectional view, multiple vertical dividing walls 5 can be seen, between which multiple shelves 6 are arranged. To avoid overloading the drawing, only four shelves are illustrated. Here, customary pharmaceutical packages 3 are arranged on two of the shelves 6 and storage location receptacles 11 are arranged on two of the other shelves 6 on each of which one bottle 2 is arranged. A storage location receptacle 11 corresponds to a corresponding storage location 10, wherein such storage location 10 is a "virtual" storage location with a configuration and size vary depending on the bottle 2 that is to be stored.

A storing device 40 is shown in the lower area of the picking device 1, which can be used to move bottles 2 from the outside into the picking device 1. On the storing member 49, which is indicated as continuous belt in the embodiment shown, two storing receptacles 41 are indicated, on each of which is arranged a bottle 2 that is to be stored. Both the storing device 40 and the operating device 20 are coupled with a control device 70, which is schematically indicated in FIG. 1. Normally, a picking device may include two of the "shelf rows" illustrated in FIG. 1, wherein the operator device is displaceable in a channel between the shelf rows arranged opposite each other.

Figure 2:
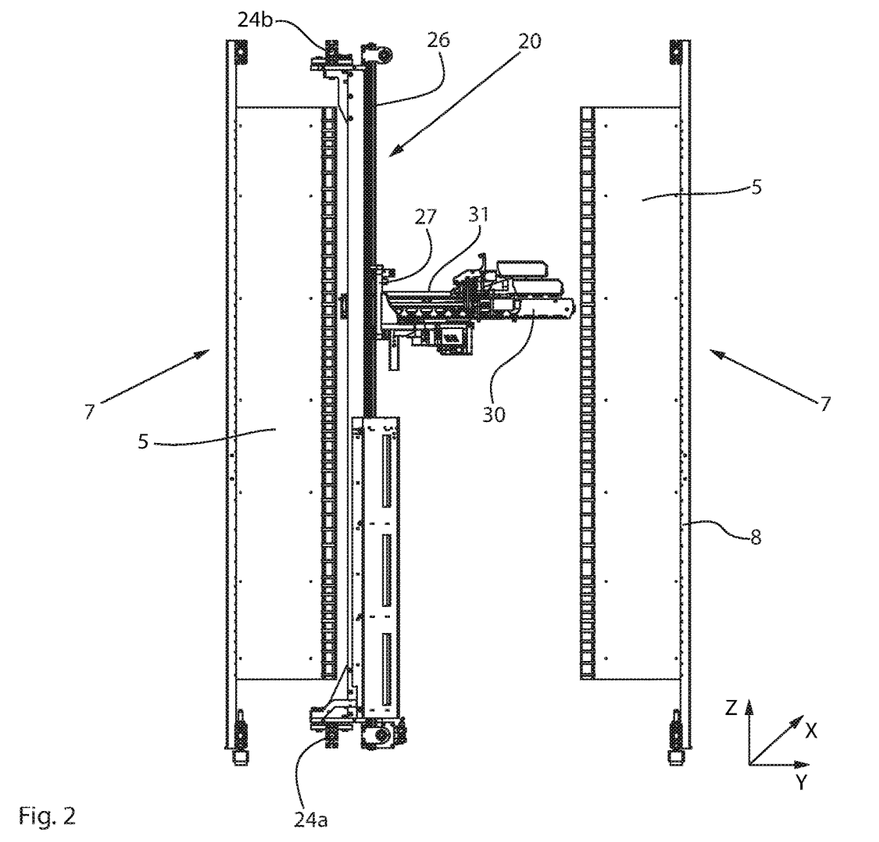
FIG. 2 shows a sectional view in the Y direction through the picking device of FIG. 1.

FIG. 2 shows a different sectional view through the picking device 1, wherein it can be seen from this section along the Y direction that the picking device 1 includes two shelf rows 7 arranged opposite each other. Furthermore, it can be seen in FIG. 2 that the operating device 20 is displaceable in the Z direction and X direction along the horizontal guides 24*a*, 24*ba* and the vertical guide 26. If a storage location in the "right" shelf row 7 is to be accessed, the gripper 30 may be turned about its longitudinal axis by 180 degrees. As can be seen in FIG. 2, the shelf rows 7 are typically closed towards the exterior by a cover 8.

Figure 3:
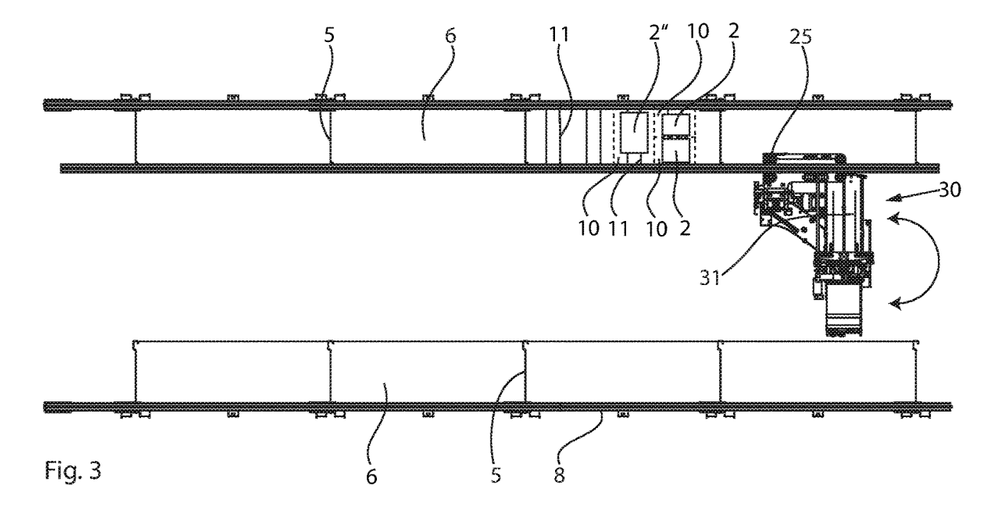
FIG. 3 shows a top plan view of the picking device of FIG. 1.

FIG. 3 shows a plan view of a section of the picking device 1. As can be seen, several shelves 6 are arranged between multiple vertical shelf walls 5. Several storage location receptacles 11 are only indicated on one shelf 6. It can also be seen in FIG. 3 that the storage locations 10 are distributed on a shelf 6 depending on the dimensions of the bottles 2. While two bottles 2 are stored one after another in the right storage row, and thus two storage locations 10 are provided, only one elongated bottle 2" is stored to its left such that this storage row only provides one storage location 10. If the bottle 2" was to be retrieved, two storage locations 10 of the same size may be provided in this shelf row, such as illustrated in the right storage row.

FIG. 3 shows the gripper 30 of the operating device 20 with two prongs of a fork-shaped gripping member 31, wherein the gripping member 31 will be described in further detail below.

Figure 4:
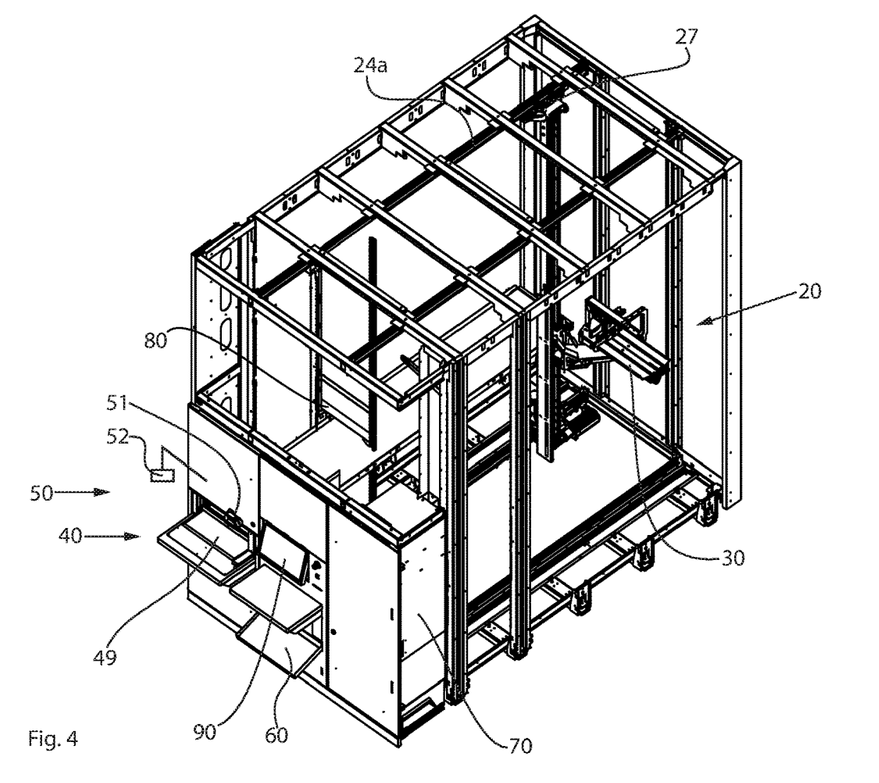
FIG. 4 shows a perspective view of the picking device of FIG. 1.

FIG. 4 shows an oblique view of the picking device 1, wherein most of the lining elements are omitted to better visualize the components arranged in the interior. This illustration shows particularly the arrangement of the storing device 40 with respect to the entire picking device 1. A section of the storing member 49 of the storing device 40 may protrude from the "front" of the picking device 1. The pharmaceutical packages 3 or bottles 2 that are to be stored are deposited in this section. An illustration of the storing receptacles has been omitted in this illustration as only the general overall structure is to be illustrated.

An identification device 50 may include a permanently fixed identification device 51 arranged above the opening of the protruding section and may be arranged above the section of the storing device 40 protruding from the picking device 1. Further, the identification device 50 may include a mobile identification device 52, which may be manually operated by a user, for example, to scan a bar code of a bottle 2.

A measuring device 80 is indicated, in the storing direction, behind the protruding section of the storing device 40 and above the storing device 40. The measuring device 80 may be used to measure the diameter and length of bottles 2 transported past the measuring device 80.

In addition, a section of the unloading device 60 is shown in the right front section of the picking device 1 and may be used to issue bottles 2 or pharmaceutical packages 3 from the picking device 1. An indicating device 90 for the operating staff is indicated above the unloading device 60. In addition, the actual arrangement of the control device 70 within the picking device 1 is indicated.

Figure 5:
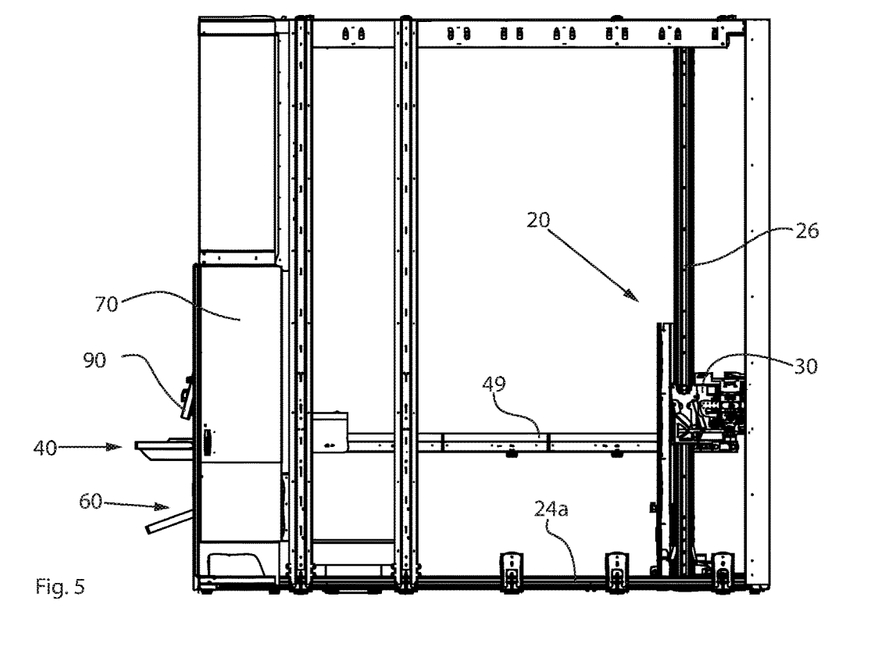
FIG. 5 shows a side view of the picking device of FIG. 1, wherein additional components are illustrated.

FIG. 5 shows a side view of the representation in FIG. 4. Here it can be seen that the storing device 40 may extend almost entirely through the picking device in the X direction. In particular, this has the advantage that the entire length of the storing device 40 may be used as a kind of intermediate buffer such that, for example, the operating staff is able to deposit and store bottles 2 more quickly than the operating device 20 is able to arrange them at their final storage locations 10.

Figure 6:
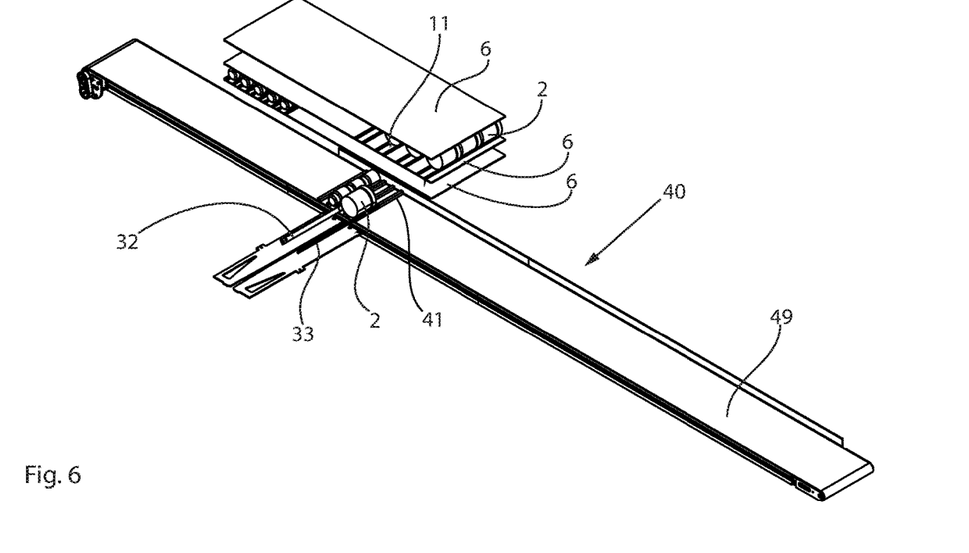
FIG. 6 shows a schematic view of some components of the picking device of FIG. 1.

FIG. 6 shows a schematic view of some components of picking device 1, in particular, the storing device 40, parts of the gripper 30, some shelves 6 and storing receptacles 41 and storage location receptacles 11 arranged on the storing device 40 and the shelves 6.

Figure 7:
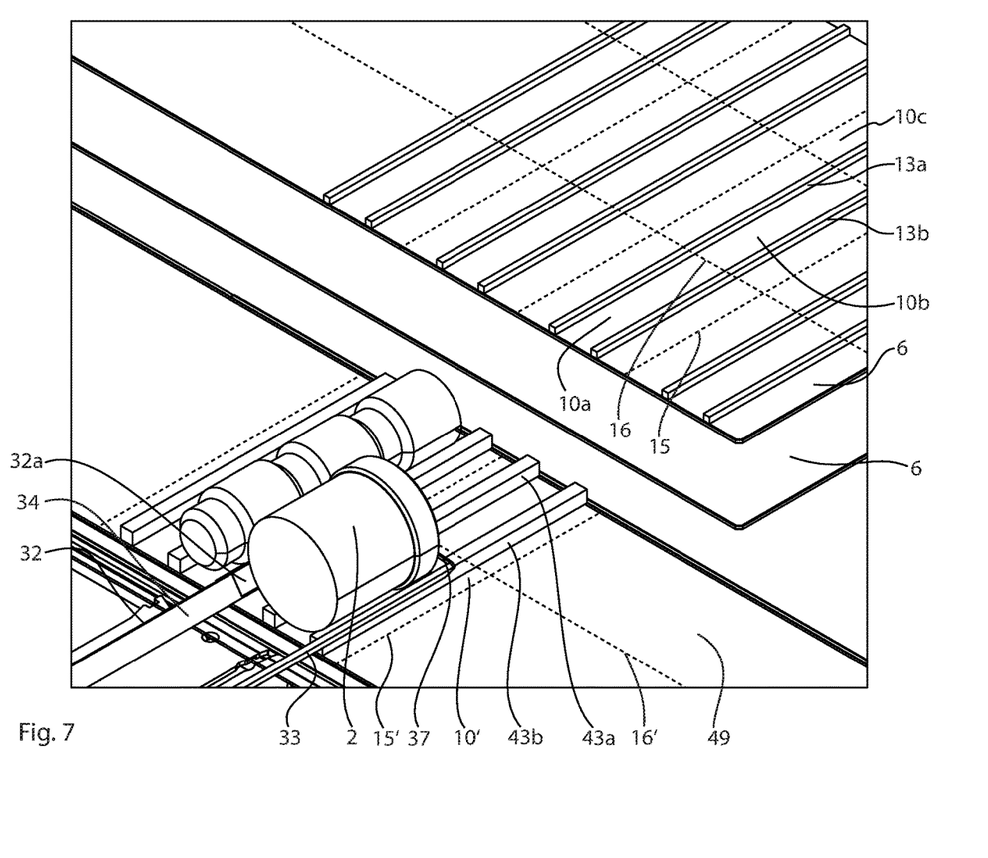
FIG. 7 shows a detail view of a portion of FIG. 6.

FIG. 7 shows a detail view for FIG. 6, wherein the bottles 2 illustrated in FIG. 6 have been omitted for better illustration of the storage location receptacles 11. Two shelves 6 are indicated in the upper section according to FIG. 7, wherein multiple storage location receptacles 11 in the form of storage location bases 13 are illustrated on the upper shelf 6, each of which is formed by a pair of parallel longitudinal struts 13*a*, 13*b*. Each pair of parallel longitudinal struts 13*a*, 13*b* may provide one or several storing receptacles 41, in particular depending on the dimensions of the bottles 2 that are to be stored. In FIG. 7, it is assumed that only bottles 2 of the same dimensions are stored in the visible area, in particular three bottles 2 one after another in a storage row, wherein a storage row is defined by a storing base. Accordingly, three storage locations 10*a*, 10*b* and 10*c* and three corresponding storage location receptacles 11, which are structurally connected with each other in this case, are provided in each storage row. In FIG. 7, the separation of the individual storage locations 10*a*, 10*b* and 10*c* is indicated by the dotted storage location separation lines 15, 16.

The lower left part of FIG. 7 shows a section of a storing member 49 with two storing receptacles 41 applied thereon, which are in turn configured as storing bases provided by a pair of parallel struts 43*a*, 43*b*. The right storing base provides two storage locations 10' due to the size of the bottle 2, which is configured as a kind of can here. The left storing base provides three storage locations due to the smaller size of the bottles 2. The separation of storage locations 10' is indicated by the dotted storage location separation lines 15', 16'.

Of the gripper 30, only the prongs 32, 33 are shown, which are configured as elongated rods disposed in a V-shaped manner having adhesion-promoting sections 32a at their ends. A frictional connection between the inner surfaces and the bottle is produced via inner surfaces of the prongs 32, 33 opposite each other, of which only the inner surface 34 of prong 32 can be seen. Each prong may include a carrier 37 at its end, of which only the carrier 37 of prong 33 can be seen in FIG. 7. One section of the carrier 37 engages behind an end of the bottle 2 such that there is not only a frictional connection but a positive connection as well between the bottle 2 and the prongs 32, 33.

Figure 8:
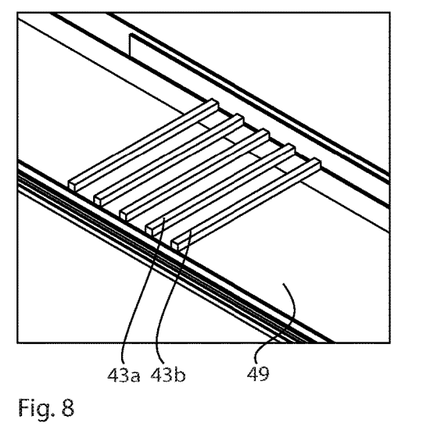
FIG. 8 shows a detail view of one or more embodiments of a storing device with storing bases disposed thereon.

FIG. 8 again shows a detail view of a storing member 49 with two storing receptacles 41, each of which is configured as a storing base having two parallel struts 43a, 43b.

Figure 9:
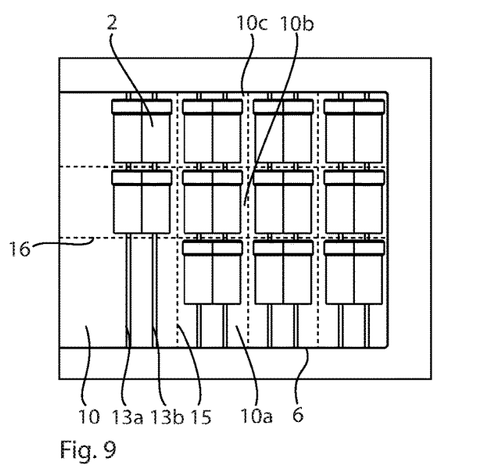
FIG. 9 shows a detail view of one or more embodiments of bottles disposed on storage location bases.

FIG. 9 shows a section of a shelf 6 having four parallel storing bases, each of which is formed by two parallel struts 13a, 13b. Each of the storing bases shown provides storage location receptacles 11 for three bottles 2. As explained above, the storage locations 41 and the number of storage location receptacles 11 per storage row depend on the dimensions of the stored bottles 2.

Figure 10:
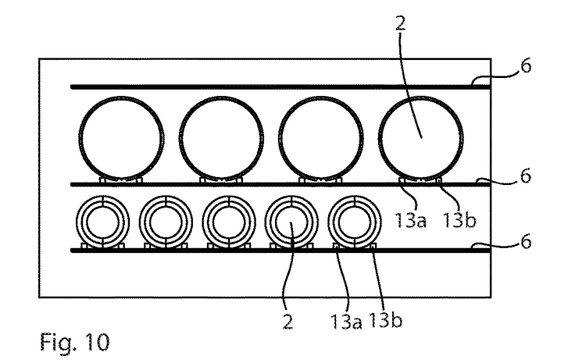
FIG. 10 shows a side view of one or more embodiments of a storage area of bottles.

FIG. 10 shows a side view of a storage area of bottles 2. In particular, FIG. 10 illustrates that the horizontal spacing of the shelves 6 differs in such a way that this spacing is adapted to bottles 2 of different diameters. As can be surmised from FIG. 10, the storage location receptacles 11 used for the different bottles 2, consisting of two parallel struts 13a, 13b, are the same for bottles 2 of small and large diameters.

Figure 11:
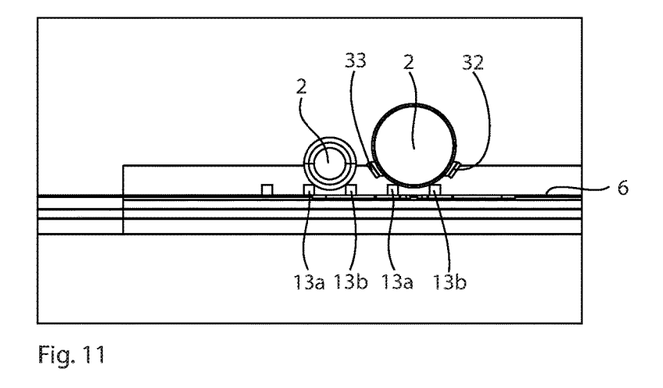
FIG. 11 shows a side view of one or more embodiments of a storage area.

FIG. 11 shows another view of a storage area for bottles 2 and illustrates that for optimal use of a storage area it is also possible to store small bottles 2 next to large bottles 2, in particular if it is not possible to store two large bottles 2 on adjacent storage location receptacles 11 due to the diameters thereof.

Figure 12A:
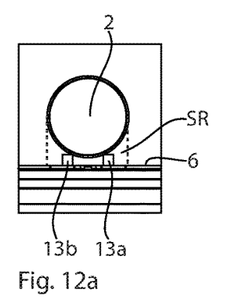
FIGS. 12a-12d show schematic snapshots of one or more embodiments of a method for retrieving medicine bottles.
Figure 12B:
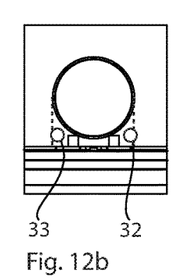
Figure 12C:
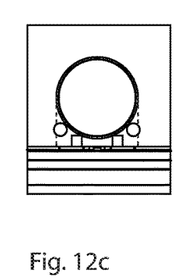
Figure 12D:
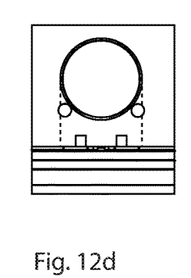
Figure 13A:
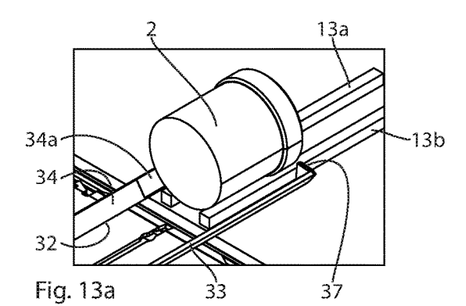
FIGS. 13a-13e show schematic snapshots of one or more embodiments of a method for retrieving medicine bottles.
Figure 13B:
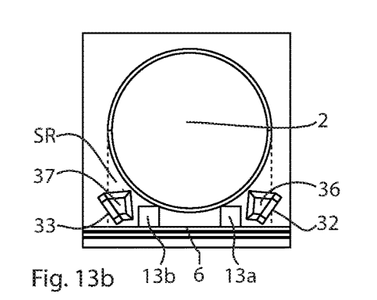
Figure 13C:
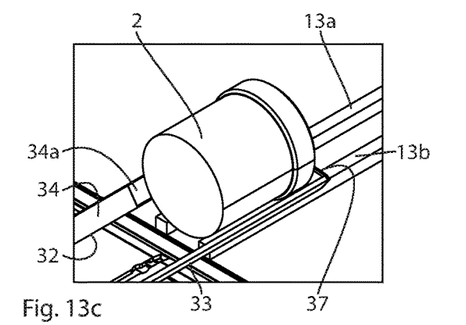
Figure 13D:
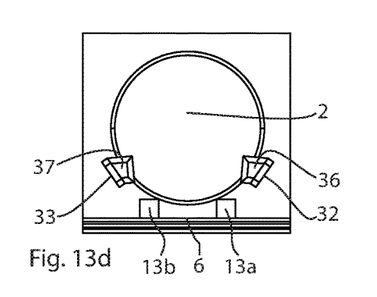
Figure 13E:
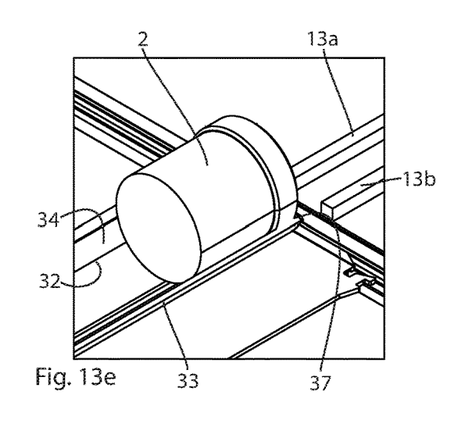

FIGS. 12a-12b show schematic snapshots of a method of operating a picking device. Using a control device, the storage location of the bottle 2 that is to be retrieved (as represented in FIGS. 12a-12d) is determined. As shown in FIG. 12a, the bottle 2 lies on a storage location receptacle that is configured as storage location base formed by two parallel struts 13a, 13b. When viewed from above, the cross-section of the bottle 2 forms an area on the shelf 6 that is hereinafter referred to as cross-section shadow surface, or in short, shadow surface SR. As can be seen in FIG. 12b, the prongs 32, 33 which are configured as circular rods, are moved, at least in sections, into the shadow space SR in order to retrieve the bottle 2. As soon as the prongs 32, 33 have been moved far enough with respect to the length of the bottle 2, the prongs 32, 33 are moved upwards in the Z direction until producing a frictional connection between the inner surfaces of the prongs 32, 33 and the bottle 2, as represented in FIG. 12c. As shown in FIGS. 12a-12d, the bottle 2 is then removed from the storage location receptacle via another upwards movement of the prongs 32, 33 in the Z direction. As soon as the bottle 2 is lifted high enough, the bottle 2 can be moved back to the gripper via a movement in the Y direction.

FIGS. 13a-13e show schematic snapshots of a method of operating a picking device. This shows an advanced stage of the method, in which, in particular, the prongs 32, 33, which are configured as rods disposed in a V-shaped manner, have been moved into the shadow space SR below the bottle 2 that is to be retrieved. Here, carriers 36, 37 are arranged at the ends of the prongs 32, 33 (see in particular FIGS. 13b, 13d). As can be seen particularly in FIG. 13b, no frictional connection is produced yet between the prongs 32, 33 and the bottle 2 immediately after the prongs 32, 33 have been introduced into the shadow space SR. To produce such frictional connection, the prongs 32, 33 are moved upwards in the Z direction from the position shown in FIG. 13a, 13b, and in particular to the position shown in FIGS. 13c, 13d. In this position, there is a frictional connection between ends 34a of inner surfaces 34 of the prongs 32, 33 and the bottle 2 that is to be retrieved. Here, the carriers 36, 37 further cause a positive connection between the carriers 36, 37 and the bottle 2. As soon as the positive connection and frictional connection is produced, the bottle 2 which is to be retrieved can be moved to the gripper, which is only indicated in FIG. 13e, via a movement of the prongs 32, 33 in the Y direction.

Figure 14:
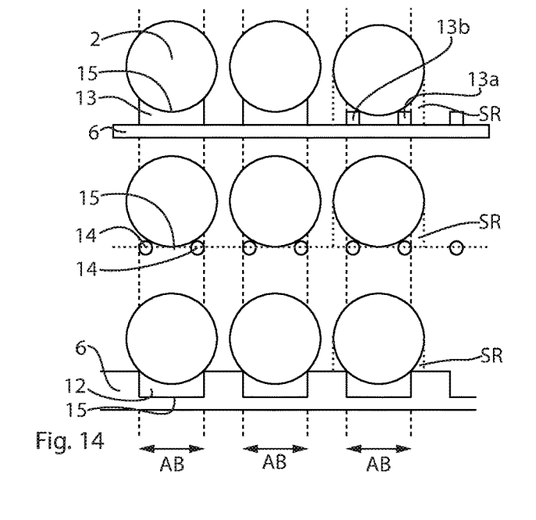
FIG. 14 shows one or more embodiments of different types of storage location receptacles.

FIG. 14 shows several variants of storage location receptacles. The storage location receptacles are shown as storage location bases 13 in the upper row, which are arranged on the surface of a shelf 6. The upper form of the two left storage location bases 13 is adapted to closely match the round form of the bottle 2 that is to be stored. On the one hand, this provides for a good retention of the bottles 2, but, on the other hand, it has the disadvantage that this good retention is only provided for bottles 2 closely matching the rounding of the base. As shown in the upper right corner in FIG. 14, the storing base is formed by two parallel struts 13a, 13b, which has the advantage that bottles 2 of different diameters may be stored.

In the center row, the storage location receptacles are formed by a plurality of parallel storage location struts 14. The occupancy density of the parallel storing struts depends on the diameter of the bottles 2 that are to be stored.

In the lower row, several storage location receptacles configured as storage location recesses 12 that may be incorporated into the shelf 6 in the form of grooves are shown.

The shadow spaces SR, which can be of different sizes depending on the kind of storage of the bottle 2, are indicated for each right-most bottle 2 of a row.

As can be seen in FIG. 14, all storage location receptacles shown include a recess 15 extending in the Y direction. Due to the different configurations of the storage location receptacles, each recess 15 is of a different configuration. However, each recess 15 extends in the Y direction and forms a "center" for the storage of the bottles 2.

Furthermore, three double-headed arrows marked with AB indicate that the outer receptacle width of all storing receptacles for storing bottles 2 of the same diameter is the same irrespective of their configuration.

Though FIG. 14 shows several types of storage location receptacles, this type of configuration of the storage location receptacles may also be applied to the storing receptacles, in particular, without changing the type of receptacle such that no representation thereof is included herein.

Securing the bottles may also be performed using other structures (e.g., by side receptacles that are adapted to bottles with pre-determined diameters. Clamping holders that clamp the bottle as soon as it is moved to a pre-determined position using the gripper or the gripper reaches a pre-determined position may also be provided.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

The invention claimed is:

1. A picking device for storing bottles, the picking device comprising:
   a storage location;
   a control device; and
   an operating device coupled to the control device, the operating device displaceable horizontally in an X direction and vertically in a Z direction, the operating device comprising:
      a gripper having a vertical axis and configured to be turned 180 degrees about its vertical axis; and
      a gripping member,
   wherein the control device causes the operating device to move a bottle from the storage location by moving the gripping member underneath a bottom portion of the bottle, moving the gripping member upward to contact the bottom portion of the bottle, lifting the bottle and moving the bottle horizontally in a Y direction by only a frictional connection between the bottom portion of the bottle and the gripping member.

2. The picking device of claim 1, wherein the storage location is configured to prevent the bottles held therein from rolling.

3. The picking device of claim 1, further comprising:
an identification device for identifying bottles; and
an unloading device, the unloading device configured to receive bottles transferred by the operating device for retrieval from the picking device.

4. The picking device of claim 1, wherein the storage location comprises one of:
a storage location receptacle disposed on a storage shelf; and
a storing receptacle of a storing device, the storing device configured to move bottles into the picking device.

5. The picking device of claim 4, wherein one of the storing receptacle and the storage location receptacle has a recess extending in a Y direction orthogonally to the X direction.

6. The picking device of claim 4, wherein the storing receptacle is a storing recess in a storing member of the storing device and the storage location receptacle is a storage recess within a storage location on the storage shelf, each storing recess configured to protect the bottle from rolling when the bottle is in a lying position.

7. The picking device of claim 4, wherein one of the storing receptacle and the storage location receptacle is a raised storing base configured to protect the bottle from rolling when the bottle is in a lying position.

8. The picking device of claim 4, wherein one of the storing receptacle and the storage location receptacle is formed by a plurality of parallel struts.

9. The picking device of claim 4, further comprising one of a plurality of storing receptacles and plurality of storage location receptacles, all having the same outer receptacle width irrespective of a diameter of the bottle to be stored.

10. The picking device of claim 1, wherein the gripping member has two prongs defining a fork-shaped construction, wherein the two prongs are displaceable together in a Y direction orthogonally to both the X direction and the Z direction and are displaceable together in the Z direction.

11. The picking device of claim 10, wherein the prongs are configured such that they are movable in the Y direction, at least in sections, in a space defined by a cross-section of the bottle that is to be retrieved and situated below a maximum cross-section in the X direction.

12. The picking device of claim 10, wherein the prongs are arranged in a stationary manner on the gripping member, wherein the distance between opposite inner surfaces of the prongs is greater than an outer receptacle width of the storing location.

13. The picking device of claim 10, wherein the prongs have a cylinder-shaped configuration.

14. The picking device of claim 10, wherein the prongs have a rod-shaped configuration and are configured to be rotatable about a longitudinal axis.

15. The picking device of claim 10, wherein at least one prong has a carrier at its end, wherein a portion of the carrier extends away from the at least one prong and is configured to engage behind an end of the bottle.

16. The picking device of claim 1, further comprising a measuring device configured to determine at least the diameter of the bottle.

17. A method for retrieving bottles, the method comprising:
providing the picking device of claim 1;
determining, by the control device, a storage location of a selected bottle;
displacing, by the control device, the operating device to the determined storage location;
removing, by the control device, the selected bottle from the storage location, the removing the selected bottle comprising:
moving prongs of the gripping member parallel to the storage location of the selected bottle in a Y direction, at least in sections, in a space defined by the cross-section of the selected bottle and situated below a maximum cross-section in an X direction;
moving the prongs upwards in a Z direction and producing a frictional connection between the prongs and a bottom portion of the selected bottle;
moving, by only the frictional connection with the prongs, the selected bottle away from the storage location; and
transferring, by the operating device, the selected bottle to an unloading device.

18. The method of claim 17, wherein after producing the at least one of the frictional connection and the positive connection between the prongs and the selected bottle, further comprising:
pulling the selected bottle from the storage location onto the gripper by moving the prongs backwards in the Y direction.

19. The method of claim 17, wherein after producing the frictional connection, further comprising:
lifting the selected bottle from the storage location via a movement in the Z direction; and
moving the prongs backwards in the Y direction.

20. An operating device for use with a picking device for storing bottles, the operating device comprising:
a gripper having a vertical axis and configured to be turned 180 degrees about its vertical axis; and
a gripping member,
wherein a control device causes the operating device to move a bottle from the storage location by moving the gripping member underneath a bottom portion of the bottle, moving the gripping member upward to contact the bottom portion of the bottle, lifting the bottle and moving the bottle horizontally in a Y direction by only a frictional connection between the bottom portion of the bottle and the gripping member,
wherein the operating device is displaceable horizontally in an X direction and vertically in a Z direction,
and wherein the gripping member is displaceable in a Y direction orthogonal to each of the X and Z directions.

* * * * *